US010831772B2

(12) United States Patent
Anerousis et al.

(10) Patent No.: US 10,831,772 B2
(45) Date of Patent: Nov. 10, 2020

(54) FACILITATION OF DOMAIN AND CLIENT-SPECIFIC APPLICATION PROGRAM INTERFACE RECOMMENDATIONS

(71) Applicant: International Business Machines Corporation, Armonk, NY (US)

(72) Inventors: Nikolaos Anerousis, Chappaqua, NY (US); Anup Kalia, Elmsford, NY (US); Chen Lin, Raleigh, NC (US); Maja Vukovic, New York, NY (US); Jin Xiao, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 317 days.

(21) Appl. No.: 15/848,563

(22) Filed: Dec. 20, 2017

(65) Prior Publication Data
US 2019/0188276 A1 Jun. 20, 2019

(51) Int. Cl.
*G06F 16/25* (2019.01)
*G06F 9/50* (2006.01)
(Continued)

(52) U.S. Cl.
CPC .......... *G06F 16/252* (2019.01); *G06F 9/5055* (2013.01); *G06F 16/2264* (2019.01);
(Continued)

(58) Field of Classification Search
CPC ...... G06F 16/367; G06F 16/313; G06F 16/35; G06F 16/2264; G06F 16/285;
(Continued)

(56) References Cited

U.S. PATENT DOCUMENTS 6,286,047 B1 9/2001 Ramanathan et al.
8,577,914 B2 11/2013 Hossain et al.
(Continued)

FOREIGN PATENT DOCUMENTS

CN 106445515 A 2/2017
CN 107479879 A 12/2017
(Continued)

OTHER PUBLICATIONS

List of IBM Patents or Applications Treated as Related.
(Continued)

*Primary Examiner* — Jesse P Frumkin
(74) *Attorney, Agent, or Firm* — Amin, Turocy & Watson, LLP

(57) ABSTRACT

Techniques for generating domain and client-specific application program interface recommendations are provided. In one example, a computer-implemented method comprises determining a semantic similarity between a first client application program interface and a second client application program interface based on a modified client application program interface being generated by removing text data associated with a first description of the first client application program interface. The computer-implemented method can further comprise matching the first description to a second description of the second client application program interface based on the semantic similarity, resulting in on or more matched client application program interfaces. Additionally, the computer-implemented method can further comprise associating the first client application program interface with a community based on the one or more matched client application program interfaces.

24 Claims, 10 Drawing Sheets

(51) Int. Cl.

| | |
|---|---|
| *G06F 16/245* | (2019.01) |
| *G06F 16/28* | (2019.01) |
| *G06F 16/22* | (2019.01) |
| *G06F 16/35* | (2019.01) |
| *G06F 16/33* | (2019.01) |
| *G06F 40/30* | (2020.01) |
| *G06N 5/00* | (2006.01) |
| *G06N 5/02* | (2006.01) |
| *G06N 7/00* | (2006.01) |
| *G06K 9/62* | (2006.01) |
| *G06N 3/04* | (2006.01) |
| *G06N 3/08* | (2006.01) |

(52) U.S. Cl.
CPC .......... *G06F 16/245* (2019.01); *G06F 16/285* (2019.01); *G06F 16/3344* (2019.01); *G06F 16/35* (2019.01); *G06F 40/30* (2020.01); *G06K 9/6223* (2013.01); *G06N 3/0445* (2013.01); *G06N 3/0454* (2013.01); *G06N 3/088* (2013.01); *G06N 5/003* (2013.01); *G06N 5/022* (2013.01); *G06N 7/005* (2013.01)

(58) Field of Classification Search
CPC ... G06F 16/252; G06F 17/2785; G06N 5/022; G06N 3/0445; G06N 3/0454; G06N 3/088; G06N 7/005; G06N 20/10; G06K 9/6223

See application file for complete search history.

(56) References Cited

U.S. PATENT DOCUMENTS

| | | | |
|---|---|---|---|
| 8,813,102 | B2 | 8/2014 | Kim et al. |
| 9,092,276 | B2 | 7/2015 | Allen et al. |
| 9,130,900 | B2 | 9/2015 | Tran |
| 9,448,859 | B2 | 9/2016 | Gathala et al. |
| 9,621,435 | B2 | 4/2017 | Vasudevan et al. |
| 9,626,627 | B1* | 4/2017 | Deluca .................. G06N 7/005 |
| 9,690,815 | B2 | 6/2017 | Cronin et al. |
| 9,760,384 | B1 | 9/2017 | Chauhan et al. |
| 10,673,964 | B2* | 6/2020 | Lewis ..................... H04L 67/20 |
| 2005/0065930 | A1* | 3/2005 | Swaminathan ......... G06F 16/93 |
| 2005/0234873 | A1 | 10/2005 | Milligan et al. |
| 2005/0246354 | A1* | 11/2005 | Tamayo ................ G06F 16/283 |
| 2007/0288419 | A1 | 12/2007 | Strassner |
| 2010/0235313 | A1 | 9/2010 | Rea et al. |
| 2011/0153590 | A1 | 6/2011 | Chang et al. |
| 2012/0209847 | A1* | 8/2012 | Rangan ............... G06F 16/3347 707/737 |
| 2014/0337164 | A1 | 11/2014 | Whisnant |
| 2015/0128156 | A1* | 5/2015 | Zhu ..................... G06F 11/3072 719/328 |
| 2015/0212865 | A1 | 7/2015 | Hong et al. |
| 2016/0125042 | A1* | 5/2016 | Laredo ................ G06F 16/2455 707/723 |
| 2016/0239269 | A1* | 8/2016 | Cuomo ................. G06F 16/248 |
| 2016/0267153 | A1* | 9/2016 | Witkop .................. G06Q 10/00 |
| 2016/0357660 | A1 | 12/2016 | Dean et al. |
| 2017/0116326 | A1* | 4/2017 | Muthusamy .......... G06F 17/277 |
| 2017/0161062 | A1 | 6/2017 | Banerjee et al. |
| 2017/0220336 | A1 | 8/2017 | Chen et al. |
| 2017/0277756 | A1* | 9/2017 | Masuda ................. G06F 9/5072 |
| 2018/0232442 | A1* | 8/2018 | Duesterwald ............. G06F 8/36 |
| 2019/0087463 | A1 | 3/2019 | Dua et al. |
| 2019/0129773 | A1* | 5/2019 | Suter .................... G06F 11/3688 |
| 2019/0179633 | A1* | 6/2019 | Agarwal ................... G06F 8/73 |

FOREIGN PATENT DOCUMENTS

| | | |
|---|---|---|
| WO | 02/31680 A1 | 4/2002 |
| WO | 2012058003 A2 | 5/2012 |

OTHER PUBLICATIONS

Rahman et al., "RACK: Automatic API Recommendation using Crowdsourced Knowledge," IEEE 23rd International Conference on Software Analysis, Evolution, and Reengineering, Mar. 2016, pp. 349-359, IEEE Computer Society, 11 pages.

Xie et al., "Multi-Relation Based Manifold Ranking Algorithm for API Recommendation," Proceedings of the 10th Asia-Pacific Services Computing Conference (APSCC '16) LNCS 10065, Nov. 2016, pp. 15-32, Springer International Publishing, 19 pages.

Samanta et al., "Recommendation of APIs for Mashup Creation," 2016, ACM, 12 pages.

Kim et al., "Towards an Intelligent Code Search Engine," Proceedings of the Twenty-Fourth AAAI Conference on Artificial Intelligence (AAAI-10), Jul. 2010, pp. 1358-1363, Association for the Advancement of Artificial Intelligence, 6 pages.

"NL2API: Service Recommendation From Natural Language Queries," Paper 96, The 12th International World Wide Web Conference, May 2003, ACM, 8 pages.

International Search Report and Written Opinion received for PCT Application Serial No. PCT/IB2018/059902 dated May 7, 2019, 9 pages.

International Search Report and Written Opinion received for PCT Application Serial No. PCT/IB2018/059903 dated Apr. 28, 2019, 10 pages.

Trappey et al., "Ontology-Based Neural Network for Patent Knowledge Management in Design Collaboration", International Journal of Production Research, vol. 51, No. 7, 2013, pp. 1992-2005.

Office Action received for U.S. Appl. No. 15/848,589 dated Mar. 10, 2020, 42 pages.

Wu, et al., "A study of ontology-based query expansion." In Technical report CS-2011-04. 2011. (Year: 2011).

Non-Final Office Action received for U.S. Appl. No. 15/848,589 dated Dec. 11, 2019, 56 pages.

\* cited by examiner

FACILITATION OF DOMAIN AND CLIENT-SPECIFIC APPLICATION PROGRAM INTERFACE RECOMMENDATIONS

BACKGROUND

The subject disclosure relates to application program interface queries, and more specifically, to domain and client-specific application program interface recommendations.

SUMMARY

The following presents a summary to provide a basic understanding of one or more embodiments of the disclosure. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate domain and client-specific application program interface recommendations are described.

According to an embodiment, a system can comprise a memory that stores computer executable components, and a processor that executes the computer executable components stored in the memory. The computer executable components of the system can comprise an intent generator component that determines a semantic similarity between a first client application program interface and a second client application program interface based on a modified client application program interface being generated by removing text data associated with a first description of the first client application program interface. The intent generator component also matches the first description to a second description of the second client application program interface based on the semantic similarity, resulting in on or more matched client application program interfaces. Furthermore, the intent generator component also associates the first client application program interface with a community based on the one or more matched client application program interfaces.

According to another embodiment, a computer program product that facilitates application program interface recommendations can comprise a computer readable storage medium having program instructions embodied therewith. The program instructions can be executable by a processor and the processor can determine a semantic similarity between a first client application program interface and a second client application program interface based on a modified client application program interface being generated by removing text data associated with a first description of the first client application program interface. The program instructions can also be executable to match, by the processor, the first description to a second description of the second client application program interface based on the semantic similarity, resulting in on or more matched client application program interfaces. Additionally, the program instructions can also be executable to associate, by the processor, the first client application program interface with a community based on the one or more matched client application program interfaces.

According to yet another embodiment, a computer-implemented method is provided. The computer-implemented method can comprise determining, by a device operatively coupled to a processor, a semantic similarity between a first client application program interface and a second client application program interface based on a modified client application program interface being generated by removing text data associated with a first description of the first client application program interface. The computer-implemented method can also comprise, matching, by the device, the first description to a second description of the second client application program interface based on the semantic similarity, resulting in on or more matched client application program interfaces. Furthermore, the computer-implemented method can comprise associating, by the device, the first client application program interface with a community based on the one or more matched client application program interfaces.

According to another embodiment, a system can comprise a memory that stores computer executable components, and a processor that executes the computer executable components stored in the memory. The computer executable components of the system can comprise a query matcher component that receives a query comprising first text data related to an application program interface description, and generates score data based on a similarity between the first text data of the query and second text data of a topic related to the query by comparing the first text data to the second text data.

According to another embodiment, a computer program product that facilitates application program interface recommendations can comprise a computer readable storage medium having program instructions embodied therewith. The program instructions can be executable by a processor and the processor can receive a query comprising first text data related to an application program interface description, and generate score data based on a similarity between the first text data of the query and second text data of a topic related to the query by comparing the first text data to the second text data.

In some embodiments, one or more of the above elements described in connection with the systems, computer-implemented methods and/or computer program programs can be embodied in different forms such as a computer-implemented method, a computer program product, or a system.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Existing approaches to recommend services using natural language queries are based on supervised and unsupervised approaches. Supervised approaches rely on a dataset with natural language queries annotated with specific services. Because the annotation process is manual and typically utilizes deep domain knowledge, these approaches are not readily applicable on different datasets, especially datasets from new domains. For example, they are primarily based on matching keywords, entity relationships, topics, and clusters. However, keywords and entity relationships ignore the semantic similarity between a query and services. Topics and clusters capture the semantic similarity, however, they rely on mash-ups that explicitly capture relationships between services. However, for a new domain, such data is not readily available.

A framework that relies on service descriptions for recommending services can rectify the above-noted issues. One or more embodiments of the framework has the benefit of being immediately applicable as a bootstrap recommender for new datasets. To capture relationships among services, one or more embodiments of the framework can provide different approaches to construct communities where a community represents an abstraction over a group of services. Based on the communities and user queries, one or more embodiments of the framework can apply a query matching approach to recommend top-k services. The framework can be evaluated against multiple collected datasets to provide meaningful recommendations to entities across the multiple collected datasets. As used herein, the term "entity" (and "entities") can be or include hardware, software, machines, humans or otherwise.

One or more embodiments described herein can generate domain and client-specific application program interface recommendations. Additionally, one or more embodiments described herein include systems, computer-implemented methods, apparatus, and computer program products that facilitate generation of domain and client-specific application program interface recommendations.

Figure 1:
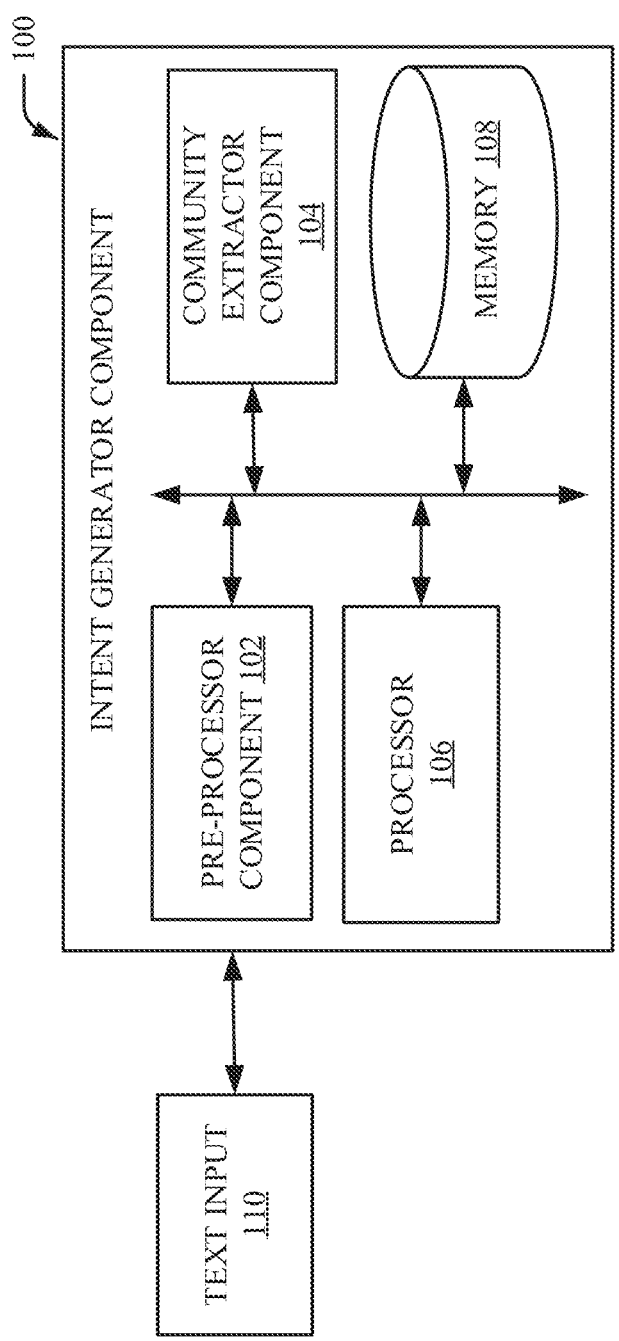
FIG. 1 illustrates a block diagram of an example, non-limiting system that facilitates domain and client-specific application program interface recommendations in accordance with one or more embodiments described herein.

FIG. 1 illustrates a block diagram of an example, non-limiting system that facilitates domain and client-specific application program interface recommendations in accordance with one or more embodiments described herein.

As depicted in FIG. 1, the intent generator component 100 can comprise several subcomponents (e.g., a pre-processor component 102, a community extractor component 104, etc.), a processor 106 and a memory 108, which can be electrically and/or communicatively coupled to one another in various embodiments. It should also be noted that, in some embodiments, the subcomponents (e.g., a pre-processor component 102, a community extractor component 104, etc.) can be external to the intent generator component 100.

Aspects of the processor 106 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the intent generator component 100. In an aspect, the intent generator component 100 can also include memory 108 that stores computer executable components and instructions.

In one embodiment, the pre-processor component 102 can receive natural language service descriptions as inputs and pre-process them using a specialized natural language program pipeline. Pre-processing can include one or more functions. For example, a punctuation of a text input 110 can be removed. Additionally, a part-of-speech (POS) tagger can be applied to extract noun phrases from the text input 110. Following these steps, words deemed to be frequent and/or infrequent can be removed. Because the most frequent words can have a high word count, but carry little semantic meaning, the effectiveness of an associated language model can be reduced by allowing frequent words to remain. The most infrequent words can also be removed because their co-occurrence with other words is dominated by chance. For example, if a service description contains a single reference to the word "microdata," all words near "microdata" are most likely to come from a single sentence, therefore, their co-occurrence cannot be generalized to other sentences. For example, infrequent words that appear in three or less documents and frequent words that appear in more than ten percent of the documents can be removed. It should be noted that any threshold number can be used to remove or extract terms and that the aforementioned numbers are merely examples.

The interpretability of a topic model can be judged by the most frequent terms associated with a topic. Post-hoc corpus-specific stop word removal, based on an effective inference model, can further increase the model interpretability. Corpus-specific stop words are terms that occur in many documents, but their frequency is not high enough to be considered as frequent words. Lowering the threshold of frequent words risks losing many other informative words. However, the stop words tend to be isolated into a few low-quality topics (e.g., words that do not carry coherent and sensible meaning). Consequently, low-quality topics can be selected to specifically remove the most frequent terms in the topics.

Additionally, the intent generator component 100 can be configured to determine a semantic similarity between application program interfaces (API) based on their descriptions. For example, a description associated with a first client application program interface can be modified via the aforementioned pre-processor component 102 processes noted above, resulting in a modified API description. The modified API description can then be compared to another client API description to determine similarities between the two. Consequently, if a certain similarity threshold is met, then the intent generator component 100 can proceed with additional processes.

A community extractor component 104 can receive the pre-processed API descriptions and form communities according to their relevance. Within each community (or, in some embodiments, within one or more communities) a hierarchical structure can be constructed where leaf nodes are topics inferred by a topic modeling technique, each topic (leaf) (or, in some embodiments, one or more topics) can be connected to a list of service descriptions, where the non-leaf nodes can represent intents. Note that the depth of the structure can indicate intents at different levels of abstraction. Intents closer to the root node can represent abstract and general intents (e.g., investment) whereas intents closer to the topics can represent detailed and specific intents (e.g., stock exchange). Topics that share common ancestors can be deemed to have a higher degree of relevance. For example, the topics "music," "TV," and "video" are loosely related although the topics "location," "route" and "map" can be deemed to be closely related.

Communities can be extracted via three approaches. The first is a baseline approach that uses a topic modeling technique where each learned topic (or, in some embodiments, one or more learned topics) forms a single community. Note that the baseline approach does not construct a hierarchical intent tree. The second approach, can be a bottom up approach that first infers topics, and then applies the community detection method to identify communities for those topics. The third approach can be a top down approach that learns a latent high-level low-dimensional vector representation for each service (or for one or more services), and then groups similar vectors into a community using a k-means cluster approach. Thereafter, a topic modeling method can be applied to services within each cluster (or, in some embodiments, within one or more clusters).

Topic non-negative matrix factorization (TNMF) is a method designed for discovering topics from short texts. Traditional modeling for non-negative matrix factorization (NMF) can decompose a term-document matrix, which indicates the term occurrence in a given document. However, for short texts, the term-document matrix can be extremely sparse, which can prevent the model from learning reliable topics. TNMF addresses this problem by making an assumption that terms co-occurring frequently are most likely to be relevant to a common topic. For example, if the terms "address" and "zip code" co-occur in several of the same documents, they are more likely to talk about a common topic (e.g., location). Thus, TNMF can learn reliable topics by decomposing a term-correlation matrix instead. Because this matrix does not suffer from a scarcity problem, the vocabulary size can remain stable even if the number of documents grow.

In TNMF, each term ti can be represented as a term occurrence vector $(w_{i,1}, \ldots, w_{i,m})$ where $w_{i,m}$ is decided based on the co-occurrence of terms ti and $t_m$. To assess $w_{i,m}$, positive point mutual information (PPMI) is computed for terms ti and $t_m$. After computing a term occurrence vector, a common vector similarity measure (e.g., cosine coefficient) is computed to produce the term correlation matrix S.

Once the term correlation matrix S is learned, the topic learning problem can be formulated as finding a term-topic matrix U that minimizes the following objective function:

$$L(U)=\|S-UU^T\|_F^2, s.\ t.\ U>=0. \qquad \text{Equation (1):}$$

Equation (1) is the objective function the model tries to minimize. As such, Equation (1) is a formulation of non-negative matrix factorization. F stands for the Frobenious form of a matrix where $\|S-UU^T\|_{ij}^2$ is represented as $\Sigma_i^j(S-UU^T)_{ij}^2$. A symmetric non-negative matrix factorization can be applied to the term correlation matrix to extract the topics and learn the term-topic matrix U. Then the topic-document matrix V can be solved based on the original term-document matrix X and term-topic matrix U at hand. Consequently, the intent generator component 100 can be configured to receive short texts, run the short texts through the pre-processor component 102 to extract extraneous text, resulting in refined text data, and then associate the refined text data with a specific topic based on TNMF performed by the community extractor component 104.

The intent generator component 100 can be employed to use hardware and/or software to solve problems that are highly technical in nature (e.g., software text searches, semantic tagging, determination of text frequency, matching of disparate terms within corpora composed of millions of terms, sentences, etc.), that are not abstract and that cannot be performed as a set of mental acts by a human due to the processing capabilities needed to facilitate domain and client-specific API recommendations from user text queries, for example. Further, some of the processes performed may be performed by a specialized computer for carrying out defined tasks related to memory operations. For example, a specialized computer can be employed to carry out tasks related to pre-processing text inputs based on a term frequency or the like.

Figure 2:
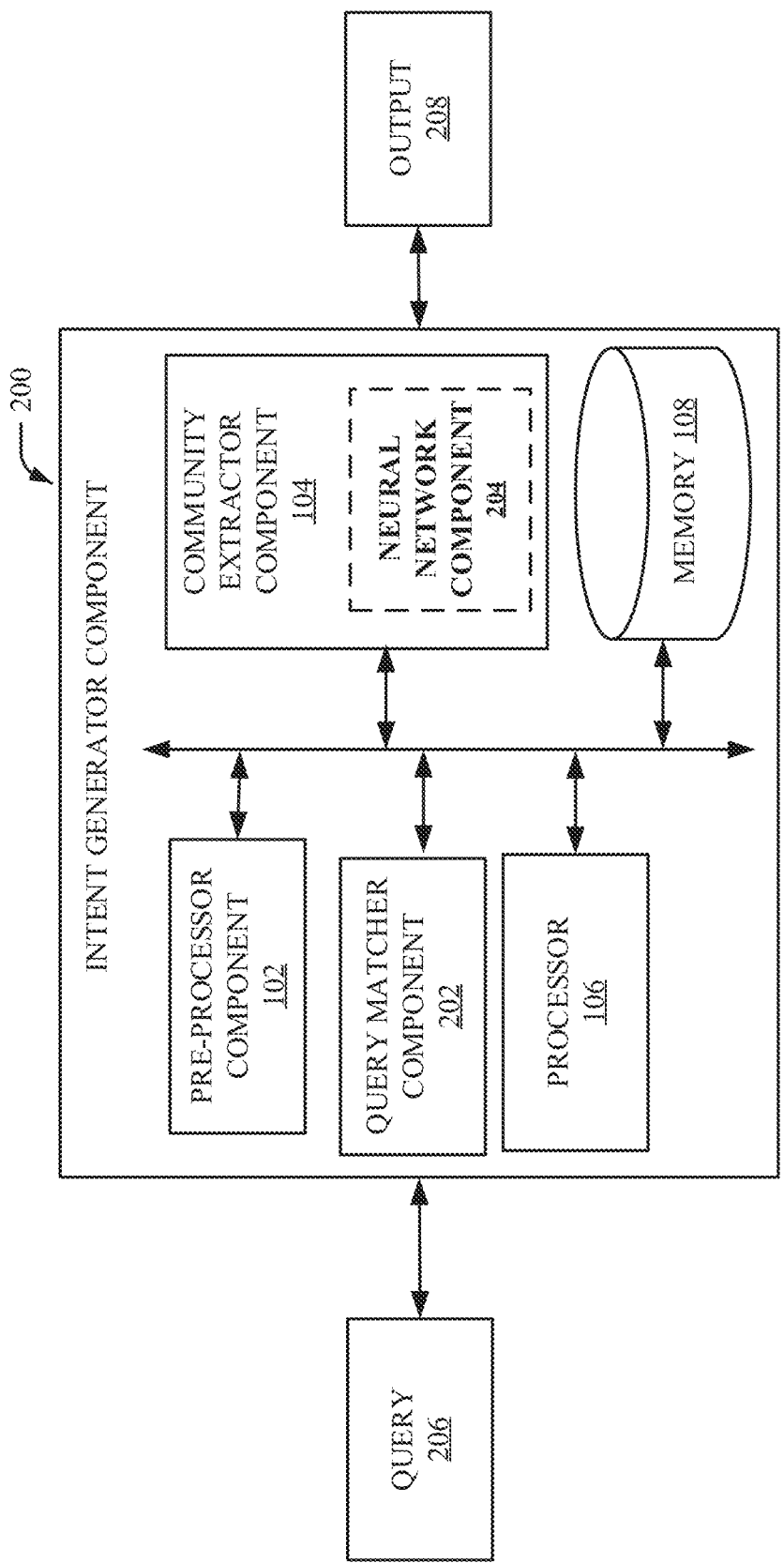
FIG. 2 illustrates a block diagram of an example, non-limiting system that facilitates domain and client-specific application program interface recommendations in accordance with one or more embodiments described herein.

FIG. 2 illustrates a block diagram of an example, non-limiting system that facilitates domain and client-specific application program interface recommendations in accordance with one or more embodiments described herein. Repetitive description of like elements employed in other embodiments described herein is omitted for sake of brevity.

The intent generator component 200 can comprise a query matcher component 202. The query matcher component 202 can recommend/output a list of services to an entity based on a query from the entity. Based on a query 206, communities and underlying topics can be checked against the query 206 to determine relationships. For instance, to check relatedness, a matching score M (query, topic) can be generated between the query 206 and the topic (e.g., the sum of the similarity scores between each word in a query and each top keyword in a given topic). The word similarity can be computed based on a Wu-Palmer score, which calculates relatedness of two word senses by considering the depths of the word senses in relation to taxonomies. The Wu-Palmer score can also calculate the depth of the word's least common subsumer (e.g., a specific ancestor node).

$$M(\text{query, topic}) = \sum_{u \in query} \sum_{u \in topic} \text{Similarity}(u, v), \qquad \text{Equation (2)}$$

$$\text{Similarity}(u, v) = \max(Wu-\text{Palmer}(u_i, v_j))(4), \qquad \text{Equation (3)}$$

where u are words in the query 206 and w are topic terms $u_i$ and $v_j$ are word senses.

Consider an ontology formed by a set of nodes and a root. In the ontology C1 and C2 can be considered two ontology elements of which we will compute the similarity. The similarity is computed based on the distance (N1 and N2) that separates C1 and C2 from the root node and the distance (N) that separates the common closest ancestor of C1 and C2 from the root node. The similarity is defined as Sim_Wu-Palmer, represented as Similarity (Wu–Palmer(C1, C2)) can equal $$\frac{2*N}{N1+N2}.$$

In terms of Wordnet, the similarity for a set of synonyms (synset) s1 and s2 is computed as considering the depths of the two synsets in the WordNet taxonomies, along with the depth of the Least Common Subsumer (LCS)). The formula $$\text{score} = \frac{2*\text{depth}(LCS)}{\text{depth}(s1)+\text{depth}(s2)}.$$

M(query, topic) represents the computation of Sim_Wu-Palmer for each word u in a query and word w in a topic. We compute Similarity(query, topic) based on a maximum value returned by M(query, topic) for u in a query and word w in a topic.

Thus, if topics under consideration belong to different communities and do not share a common ancestor, then the parent nodes of the topics can be identified, and services under the identified intents can be returned as candidates.

Given a set of services as candidates, a latent semantic index (LSI) can be used to calculate a matching score between the candidate services and the query 206. LSI can create a k-dimensional space by creating a term frequency-inverse document frequency (TF-IDF) matrix and approximating the TF-IDF matrix using singular value decomposition (SVD). SVD reduces the dimensions of the original matrix while preserving the similarity structure among columns Consequently, an entity's query 206 can be mapped to the k-dimensional LSI space. The similarity of the query 206 and a given document can be computed using the cosine similarity of two vectors. Consequently, API services with the highest similarity score can be recommended to the entity as an output 208.

The community extractor component 104 can also comprise a neural network component 204. For instance, artificial intelligence (AI) can facilitate automating one or more features in accordance with the disclosed aspects. A memory and a processor as well as other components can include functionality with regard to the figures. The disclosed aspects in connection with generating API recommendations can employ various AI-based schemes for carrying out various aspects thereof. For example, a process for detecting one or more trigger events, determining an activity as a result of the one or more trigger events, and generating API recommendations, and so forth, can be facilitated with an example automatic classifier system and process. In another example, a process for penalizing a term while preferring another term, based on frequency, can be facilitated with the example automatic classifier system and process.

An example classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities) to prognose or infer an action that can be automatically performed (e.g., extracting frequent text). A support vector machine (SVM) is an example of a classifier that can be employed. The SVM can operate by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, recurrent neural networks, decision trees, fuzzy logic models, and probabilistic classification models providing different patterns of independence can be employed. Classification as used herein also may be inclusive of statistical regression that is utilized to develop models of priority.

The disclosed aspects can employ classifiers that are explicitly trained (e.g., via generic training data) as well as implicitly trained (e.g., via observing term extraction as it relates to the triggering events). For example, SVMs can be configured via a learning or training phase within a classifier constructor and feature selection module. Thus, the classifier(s) can be used to automatically learn and perform a number of functions, including but not limited to term extraction, term weighting, term filtering, term association with topics, and so forth. The criteria can include, but is not limited to, predefined values, contribution attenuation tables or other parameters, preferences and/or policies, and so on. It should be noted that the neural network component 204 can also be a subcomponent of the various other components of this disclosure. For instance, the ontology component discussed with regard to FIG. 3 can also comprise a neural network.

Figure 3:
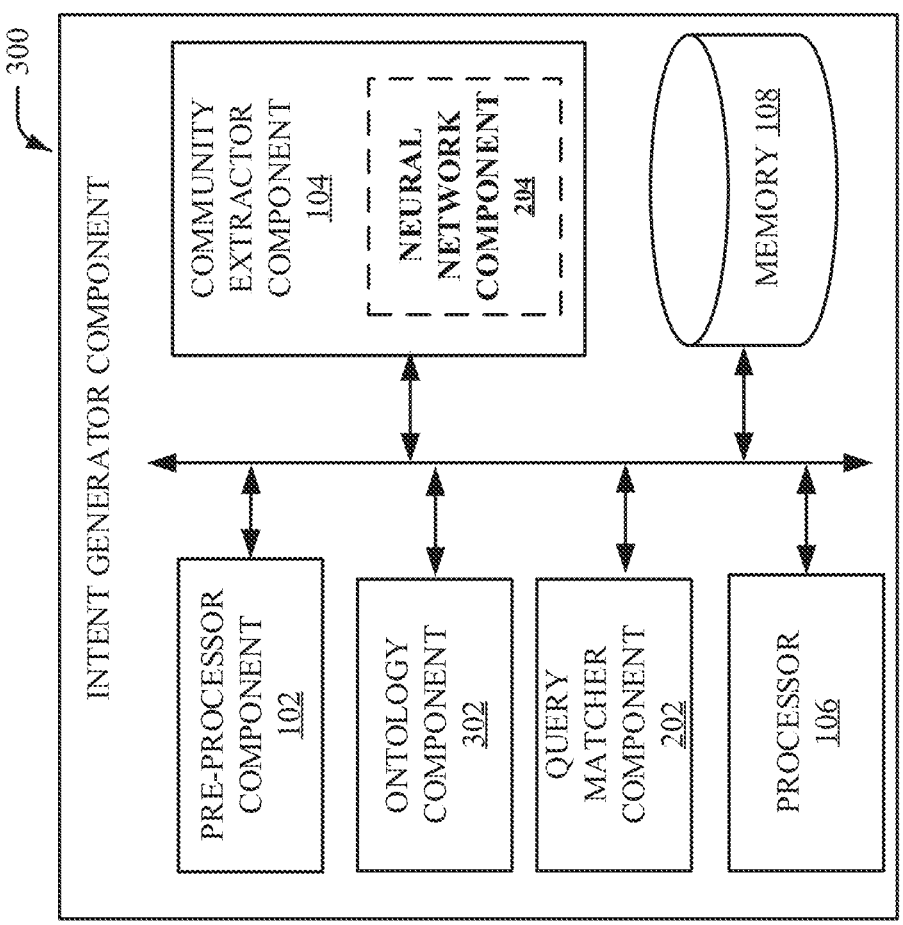
FIG. 3 illustrates a block diagram of an example, non-limiting system that facilitates domain and client-specific application program interface recommendations in accordance with one or more embodiments described herein.

FIG. 3 illustrates a block diagram of an example, non-limiting system that facilitates domain and client-specific application program interface recommendations in accordance with one or more embodiments described herein. Repetitive description of like elements employed in other embodiments described herein is omitted for sake of brevity.

In another embodiment, the intent generator component 300 can comprise an ontology component 302. The ontology component 302 can formally name and define the topics, properties, and interrelationships of the communities and queries that exist based on a client-specific and/or domain-specific query. The ontology component 302 can compartmentalize the variables needed for the computations of the intent generator component 300 and establish the relationships between them.

The ontology component 302 can be configured to recursively modify the associated ontology based on matches generated by the query matcher component 202, the output 208 (e.g., recommendations, confidence scores, etc.), feedback from entities, etc. For example, after the output data is generated for the output 208, the output data can be received by the ontology component 302. The ontology component 302 can then generate a new domain ontology from the output data, send the new domain ontology to the community extractor component 104, to the pre-processor component 102 and/or to the query matcher component 202. Based on the ontology component 302 generating a new domain ontology, the pre-processor component 102 can pre-process new inputs, in accordance with the new domain ontology, to generate additional services, topics, and/or communities.

In another embodiment, the entity can provide their own specific domain ontology or preference to the intent generator component 300 for the intent generator component 300 to match against. For example, based on the output 208 (e.g., API recommendation) generated from a text-based query of the entity, the entity can determine whether the entity prefers the recommended API or whether the entity would prefer another API. Consequently, preference data associated with the preference of the entity can be received by the ontology component 302 to further refine the matching processes for future iterations. Thus, future recommendations to the same entity can take the entity preferences into account when generating additional API recommendations.

Figure 4:
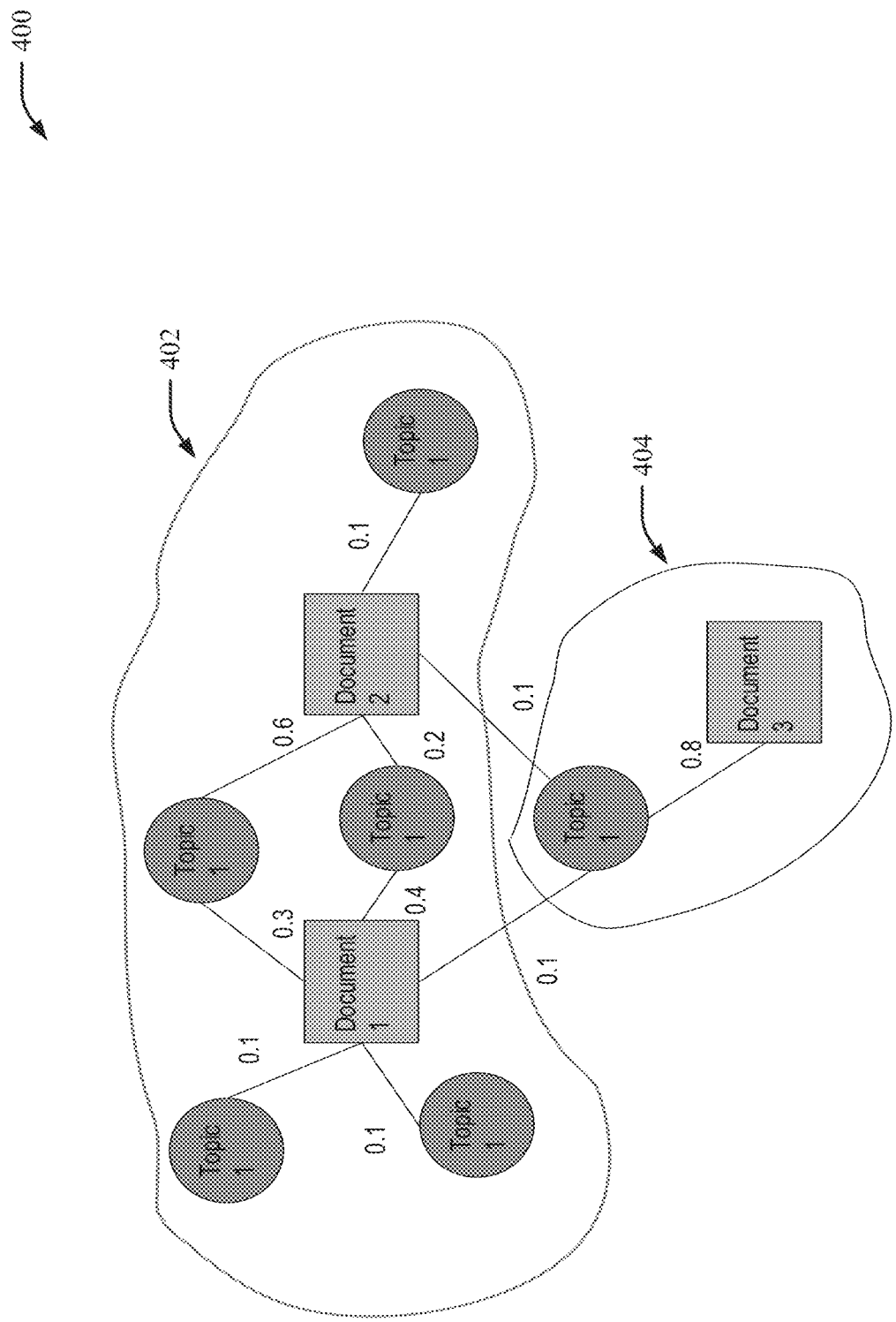
FIG. 4 illustrates an example, non-limiting system network that facilitates domain and client-specific application program interface recommendations in accordance with one or more embodiments described herein.

FIG. 4 illustrates an example, non-limiting system network that facilitates domain and client-specific application program interface recommendations in accordance with one or more embodiments described herein. Repetitive description of like elements employed in other embodiments described herein is omitted for sake of brevity.

In another embodiment, one approach the system can take is to first learn topics using TNMF (described above), and then use a greedy optimization algorithm called Louvain's community detection (LCD) to extract communities using a constructed network 400 that models pairwise association between topics and services. More specifically, the network 400 is constructed based on a learned topic-document matrix V. In the network 400, nodes can represent services (or documents) and topics. A weighted edge can be formed between the topic and services if the corresponding entry in V is non-zero. Thus, the weight is the value in that entry.

After the network 400 is completed as represented, LCD can be applied to extract communities from it. LCD is a greedy optimization algorithm where the value to be optimized by LCD is a scale value called modularity (ranging between −1 to 1 as depicted). Modularity measures the density of edges inside communities to edges outside communities. Thus, optimizing modularity can lead to partition of the community. Iterating through all possible partitions is highly impractical. Thus, a heuristic approach can be employed where the following two phases are repeated iteratively until no change occurs.

In the first phase, all nodes are assigned to their own communities. The change of modularity is computed for a moving node i from its own community 402 to its neighboring community 404 j (only contains node j at the beginning). The change of modularity can be computed using the following heuristic function:

$$\Delta Q = \left[ \frac{\sum_{in} + k_{i,n}}{2m} - \left( \frac{\sum_{tot} + k_i}{2m} \right)^2 \right] - \left[ \frac{\sum_{in}}{2m} - \left( \frac{\sum_{tot}}{2m} \right)^2 - \left( \frac{k_i}{2m} \right)^2 \right],$$ Equation (4)

where $\Sigma_{in}$ is the sum of all the weights of the edges inside the community (C) that i is moving into (e.g., community 404) (in some embodiments, $\Sigma_{in}$ can be considered to represent the sum of the links inside C); $\Sigma_{tot}$ represents the sum of the links incident to nodes in C. $\Sigma_{tot}$ is the sum of all weights of the edges in the community (e.g., community 402). The variable $k_i$ is the weighted degree of i (in some embodiments, $k_i$ can be considered to be the sum of the weights of the links incident to node i), $k_{i,in}$ is the sum of weights of the links between i and other nodes in the community (e.g., community 402) and m is the sum of the weights of all the links in the network.

In some embodiments, $\Sigma_{in}$ represents the sum of the links inside C; $\Sigma_{tot}$ represents the sum of the links incident to nodes in C; $k_i$ is the sum of the weights of the links incident to node i; $k_{i,in}$ is the sum of the weights of the links from i to nodes in C; and m is the sum of the weights of all the links in the network.

Once the value is computed for all communities node i is connected to, node i can be combined into the community 404 that resulted in the greatest ΔQ. This process can be applied sequentially to all communities in the network. During a second phase, the nodes in the same community can be grouped together, and the entire community can be treated as a node, thus a new network can be constructed. Then, the first phase can be re-applied, and this process can be repeated until no change in the modularity is larger than a defined threshold.

Figure 5:
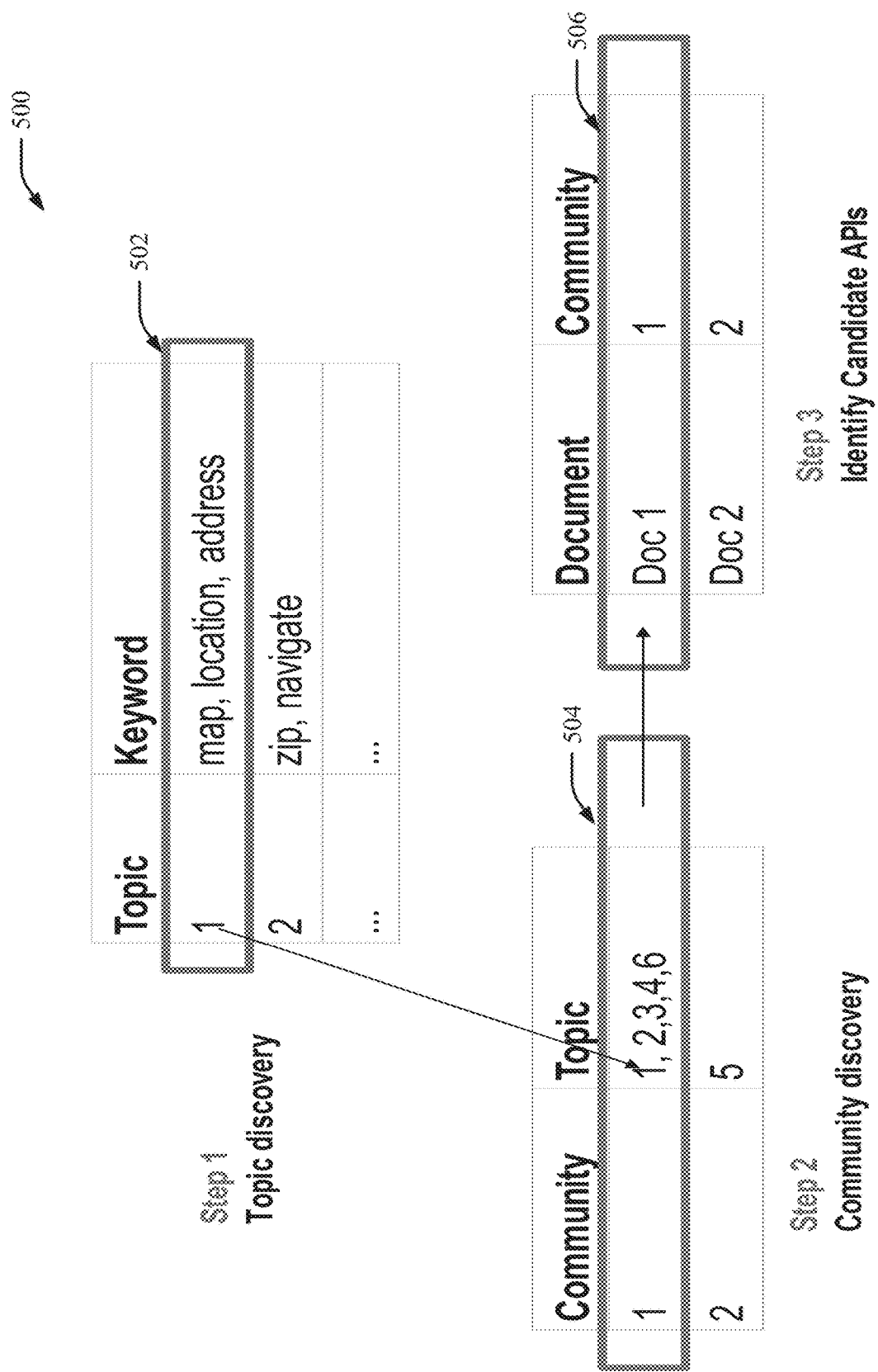
FIG. 5 illustrates an example, non-limiting block diagram that facilitates query matching utilizing a domain ontology in accordance with one or more embodiments described herein.

FIG. 5 illustrates an example, non-limiting block diagram that facilitates query matching utilizing a domain ontology in accordance with one or more embodiments described herein. Repetitive description of like elements employed in other embodiments described herein is omitted for sake of brevity.

Based on a query 206 containing text 502 (e.g., "map, location, address"), communities and underlying topics can be checked against the query 206 to determine relationships. For instance, to check the relatedness, of a query 206 for the word "location", similar terms (e.g., "map", and "address") provided can be used to generate a matching score M (query, topic). Additionally, the matching score M can be generated between the query 206 and the topic (e.g., the sum of the similarity scores between each word in a query and each top keyword in a given topic). Therefore, the words "map", "location", and "address" can be determined to be related to topic 1, wherein topic 1 is determined to be related to community 1 during a community discover process 504. Thereafter, latent semantic indexing (LSI) can be performed to identify candidate APIs 506 based on a specific document being related to community 1.

Consequently, given a set of services as candidates, the LSI can be used to calculate a matching score between the candidate services and the query. LSI creates a k-dimensional space by creating a term frequency-inverse document frequency (TF-IDF) matrix and approximating it using singular value decomposition (SVD). SVD reduces the dimensions of the original matrix while preserving the similarity structure among columns Consequently, the entity's query 206 is mapped to the k-dimensional LSI space. Thus, the similarity of the query 206 and a given document can be computed using the cosine similarity of two vectors.

Figure 6:
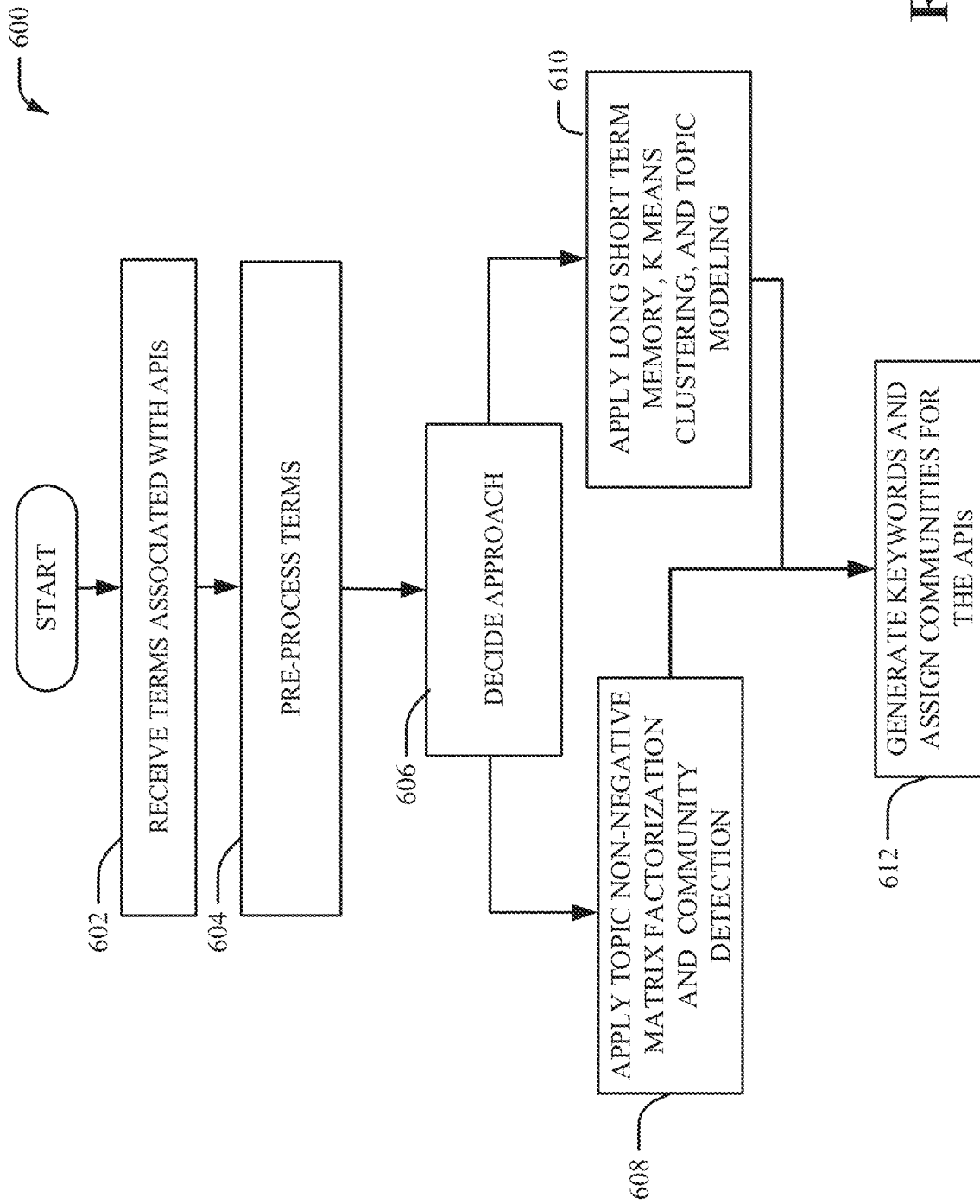
FIG. 6 illustrates an example, non-limiting flow diagram that facilitates domain and client-specific application program interface recommendations in accordance with one or more embodiments described herein.

FIG. 6 illustrates an example, non-limiting flow diagram that facilitates domain and client-specific application program interface recommendations in accordance with one or more embodiments described herein. Repetitive description of like elements employed in other embodiments described herein is omitted for sake of brevity.

In another embodiment, to learn hierarchical intents, an API recommendation process 600 can comprise receiving terms associated with an API at block 602. For example, a data store of APIs, API descriptions, and/or terms associated with the APIs can be uploaded to the intent generator component 100, 200, 300. The intent generator component 100, 200, 300 can then begin to pre-process the uploaded API terms via the pre-processor component 102. Pre-processing the API terms can be performed by several different methods including, but not limited to: 1) removing punctuation, and extracting part-of-speech tags, 2) filtering frequent and/or infrequent terms, 3) removing canonical stop words, and/or 4) extracting and removing repeated but uninformative common words. In one embodiment, the TNMF can be used to extract and remove the repeated but uninformative common words.

After the pre-processing is performed, the intent generator component 100, 200, 300 can decide at block 606 to take one of two approaches to form communities based on term relevance. The first approach comprises applying TNMF and community detection (e.g., Louvain's community detection (LCD) as discussed with regard to FIG. 4) to the pre-processed terms at block 608. The second approach comprises applying long short-term memory (LSTM), k-means clustering, and topic modeling (as discussed with regard to FIG. 8) to the pre-processed terms at block 610. Outputs from the blocks 608, 610 can both be used to generate keywords and assign communities for the APIs at block 612. It should also be noted that in additional embodiments, TNMF can be used to form communities without the LCD approach.

Figure 7:
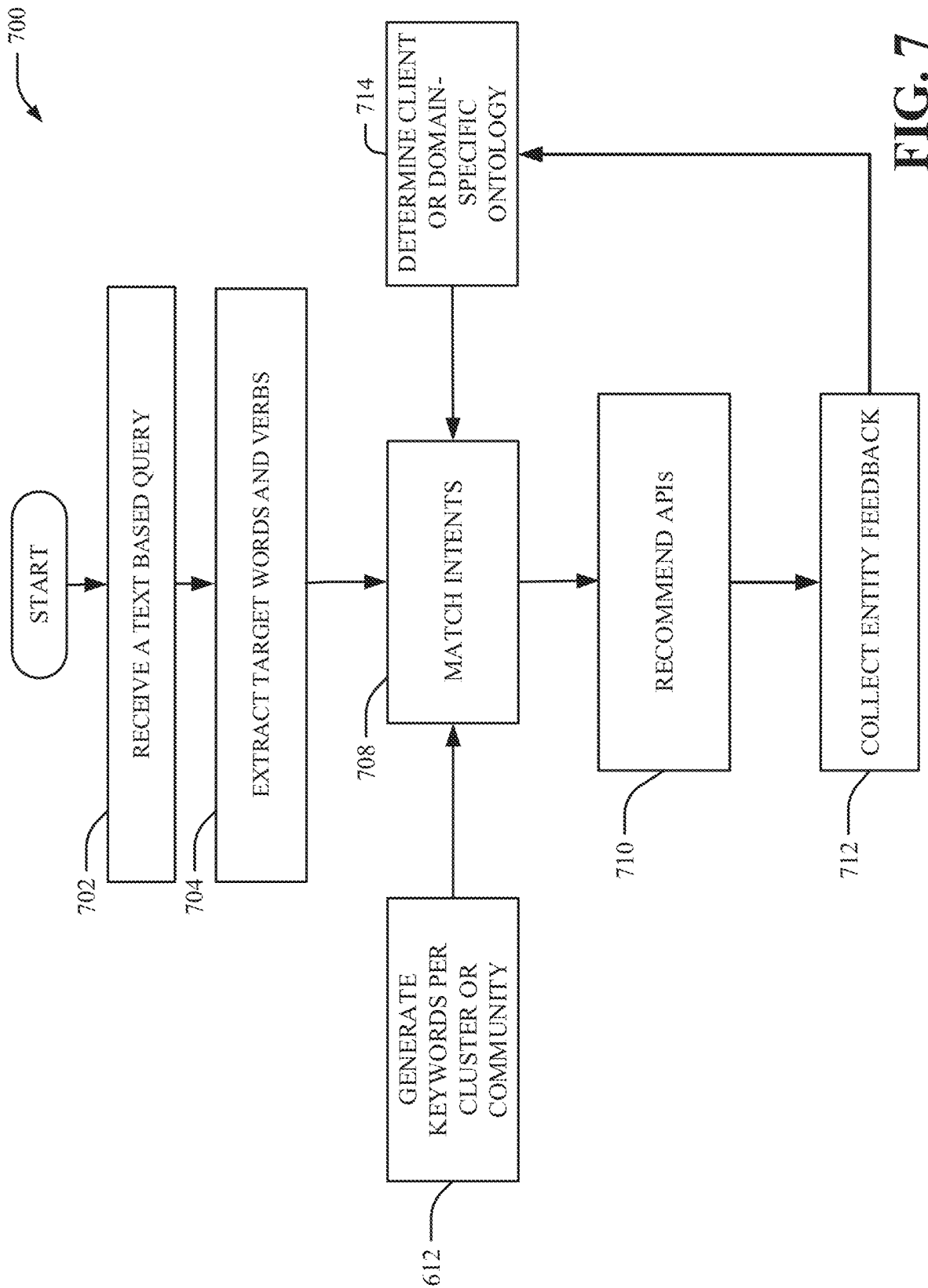
FIG. 7 illustrates an additional example non-limiting flow diagram that facilitates domain and client-specific application program interface recommendations in accordance with one or more embodiments described herein.

FIG. 7 illustrates an additional example non-limiting flow diagram that facilitates domain and client-specific application program interface recommendations in accordance with one or more embodiments described herein. Repetitive description of like elements employed in other embodiments described herein is omitted for sake of brevity.

At block 702, a text-based query for an API recommendation can be received from an entity. The text-based query can comprise a description associated with an API of interest. For example, the entity may be seeking an API associated with a location. At block 704, target words and verbs can be extracted from the description to determine a predicted intent of the entity based on the text-based query. Based on keywords generated (via the community extractor component 104) per cluster or community at the block 612, the predicted intent of the entity can be matched to the hierarchical intents generated with reference to the hierarchical intent learning process discussed previously, at block 708. The matching of the entity intent to the hierarchical intents can yield data used to recommend APIs associated with locations at block 710 based on the matched intents.

The intent generator component 100, 200, 300 can be configured to prompt an entity for and receive feedback from entities based on the recommended APIs and collect the entity feedback at block 712. For example, after APIs have been recommended at block 710, the intent generator component 100, 200, 300 can prompt the entity for feedback regarding the recommended API. The feedback can be representative of whether the entity finds the API useful in light of the query initiated by the entity. The feedback may comprise an indication that the recommended API is not applicable, that the recommended API is what the entity prefers, or that the recommended API only comprises some of the attributes preferred by the entity. The collected entity feedback can then be sent to block 714 where it can be used to determine client or domain-specific ontologies. For example, if the entity feedback indicates that the recommended APIs are far out from what the entity was querying for, then the intent generator component 300 can determine that the entity might have its own ontology that it would like to have applied to the process in the future so that the intent generator component 100, 200, 300 can provide more accurate recommendation results. Consequently, in the future, data associated with client or domain-specific ontologies can also be used to match the entity's intent to the hierarchical intents.

Figure 8:
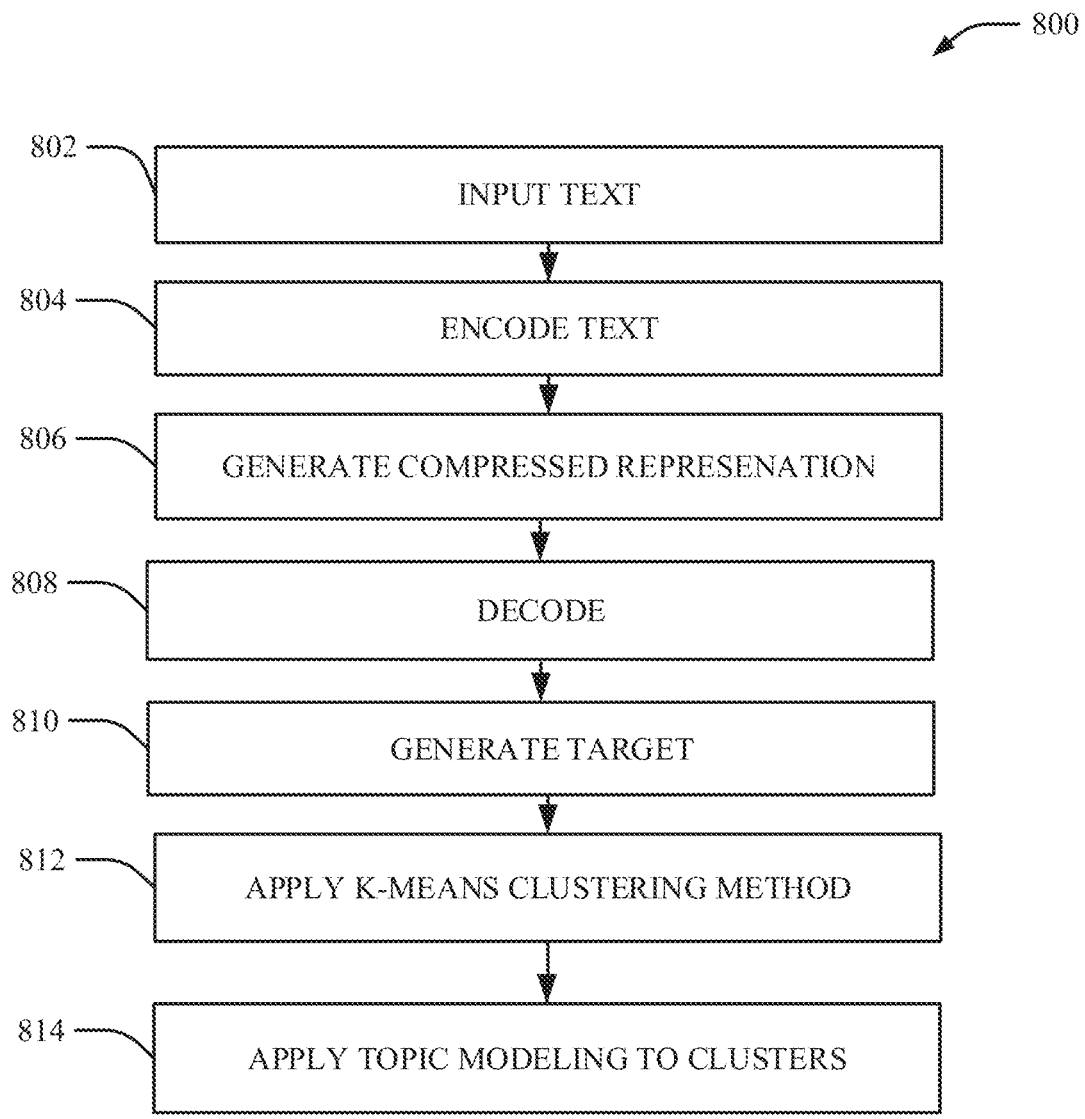
FIG. 8 illustrates an example non-limiting flow diagram for a long short-term memory auto-encoder that facilitates domain and client-specific application program interface recommendations in accordance with one or more embodiments described herein.

FIG. 8 illustrates an example non-limiting flow diagram for a long short-term memory auto-encoder that facilitates domain and client-specific application program interface recommendations in accordance with one or more embodiments described herein. Repetitive description of like elements employed in other embodiments described herein is omitted for sake of brevity.

In another embodiment, a long short-term memory (LSTM) based auto-encoder can be trained to build an embedding for the service descriptions and then decode the embedding to reconstruct the original sentence. The embedding can be viewed as a high-level low-dimensional representation of original service descriptions. Additionally, the k-means clustering method can be used to partition the service embedding into different clusters or communities.

LSTM comprises the ability to capture local dependencies between words, wherein neighboring words are combined to express a particular meaning. LSTM is a type of recurrent neural network (RNN) that can avoid the vanishing (and exploding) gradient problem. An LSTM unit can comprise three components: forget, input, and output. The components interact with each other to control how information flows. The forget component determines what information from a previous memory cell is no longer valid (due to expiration) and should be thrown away. The input component determines what information is new and requires updating, and the output component is an activation function that filters the value from a memory cell.

For example, as depicted by FIG. 8, element 802 can comprise inputting text that can be encoded at element 804. The auto-encoder can learn a compact representation of a service description leveraging an unsupervised (or self-supervised) technique where no additional labels are required. An LSTM based auto-encoder can be a neural model that comprises two LSTMs, wherein one LSTM can encode a sequence of words into a fixed-length vector representation, thereby generating a compressed representation at element 806. The output of the last LSTM unit can generate an embedding of the service description. At element 808, the second LSTM can decode the representation into another sequence of symbols. The encoder and decoder of the proposed model can be jointly trained to maximize the conditional probability of a target sequence given a source sequence, thereby generating a target at element 810. After the low dimensional representation is obtained, the k-means clustering method can be applied at element 812 to partition the services into k specified clusters or communities. Finally, TNMF can be applied to the services within each community to extract a topic per community at element 814.

Figure 9:
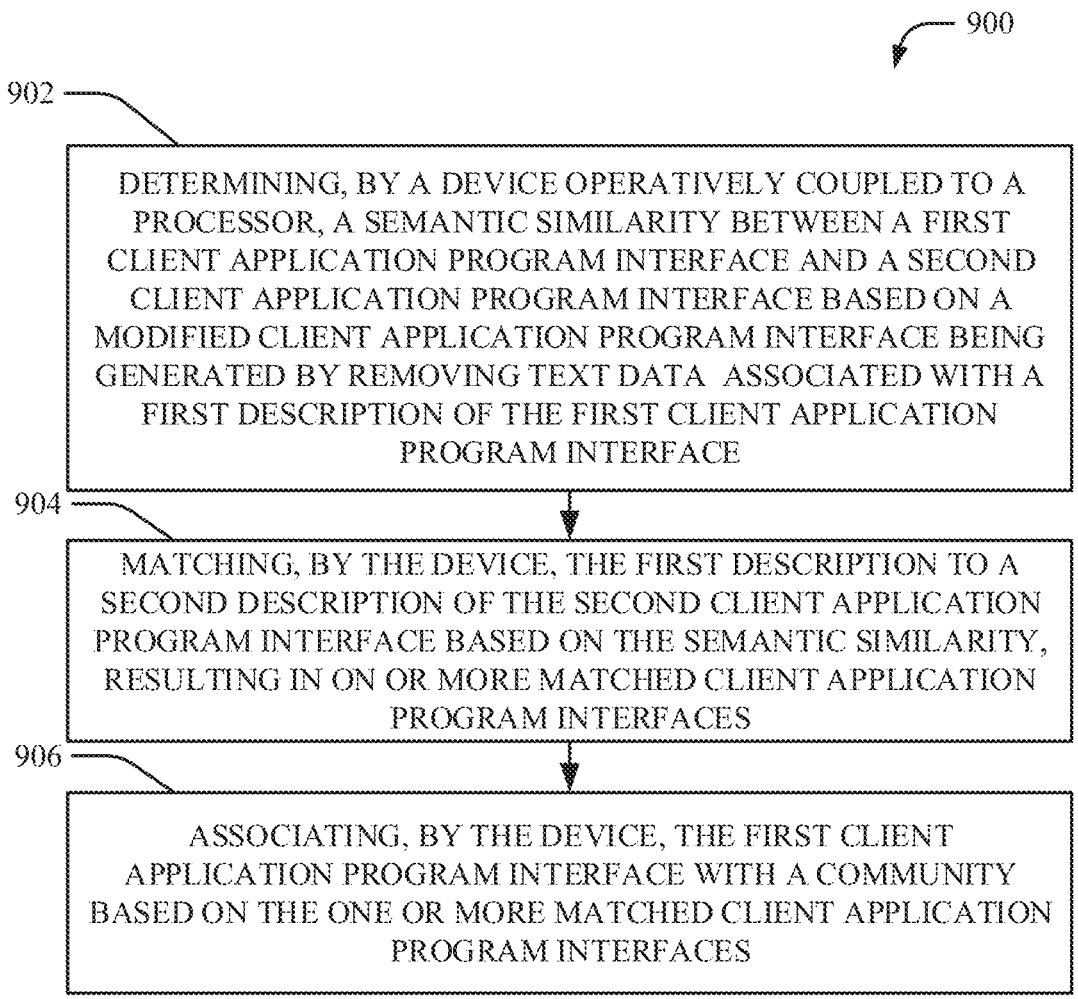
FIG. 9 illustrates an example non-limiting flow diagram of a computer-implemented method that facilitates domain and client-specific application program interface recommendations in accordance with one or more embodiments described herein.

FIG. 9 illustrates an example non-limiting flow diagram of a computer-implemented method 900 that facilitates domain and client-specific application program interface recommendations in accordance with one or more embodiments described herein. Repetitive description of like elements employed in other embodiments described herein is omitted for sake of brevity.

In another embodiment, a computer-implemented method 900 comprises modifying (e.g., via the pre-processor component 102), by a device operatively coupled to a processor, a description of a client application program interface by removing text data associated with the description of the client application program interface, resulting in a modified description of the client application program interface. The computer-implemented method can further comprise analyzing (e.g., via the ontology component 302), a performance associated with the client application program interface to generate an ontology (e.g., via the ontology component 302) based on a semantic similarity between the modified description of the client application program interface and one or more previous descriptions of one or more previous client application program interfaces.

Figure 10:
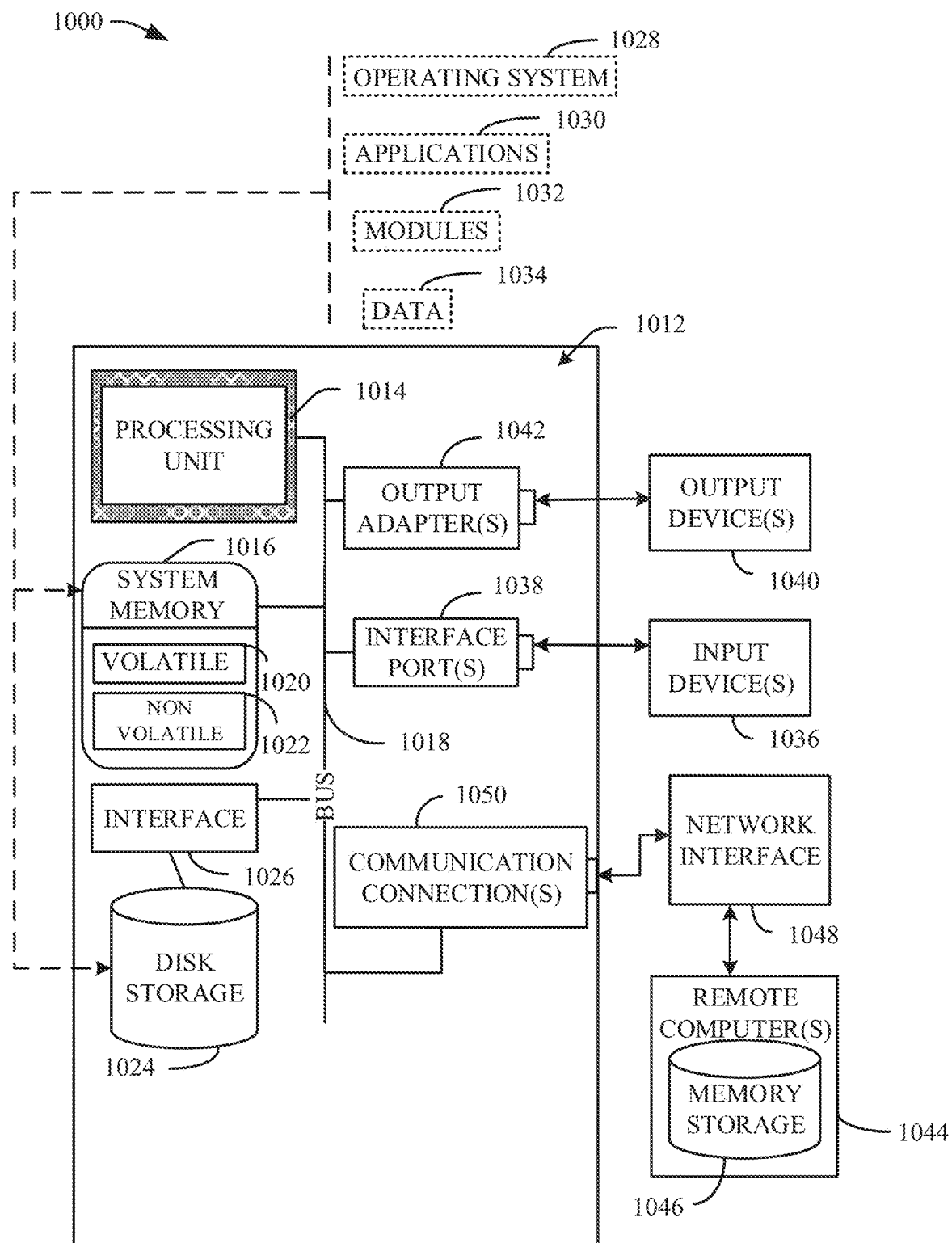
FIG. 10 illustrates a block diagram of an example, non-limiting operating environment in which one or more embodiments described herein can be facilitated.

In order to provide a context for the various aspects of the disclosed subject matter, FIG. 10 as well as the following discussion is intended to provide a general description of a suitable environment in which the various aspects of the disclosed subject matter can be implemented. FIG. 10 illustrates a block diagram of an example, non-limiting operating environment in which one or more embodiments described herein can be facilitated. With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes the computer executable components stored in the memory, wherein the computer executable components comprise:
a pre-processor component that receives first data associated with a first description of a first client application program interface and pre-processes the first data by removal of text data associated with the first description, resulting in a modified client application program interface, wherein the removal of the text data comprises removal of one or more terms in the first description that respectively appear in the first description at least a first threshold number of times; and
an intent generator component that:
determines a semantic similarity between the modified client application program interface and a second client application program interface, wherein the semantic similarity is based on a Louvain community detection process;
matches the first description to a second description of the second client application program interface based on the semantic similarity, resulting in one or more matched client application program interfaces; and
associates the first client application program interface with a community based on the one or more matched client application program interfaces.

2. The system of claim 1, wherein the removal of the text data further comprises removal of one or more additional terms in the first description that respectively appear in the first description less than a second threshold number of times.

3. The system of claim 1, wherein the community is a first community, and wherein the intent generator component generates a second community comprising the modified client application program interface, wherein the second community is utilized to generate a recommendation for a client application program interface.

4. The system of claim 1, wherein the computer executable components further comprise:
a query matcher component that matches the first client application program interface to the one or more matched client application program interfaces based on the semantic similarity.

5. The system of claim 1, wherein the community is generated based on a topic modeling associated with a topic non-negative matrix factorization.

6. The system of claim 5, wherein the community is utilized to generate a keyword to employ in provide a recommendation for a client application program interface.

7. A computer program product that facilitates application program interface recommendations, the computer program product comprising a computer readable storage medium having program instructions embodied therewith, the program instructions executable by a processor to cause the processor to:
pre-processes the first data, associated with a first description of a first client application program interface, by removal of text data associated with the first description, resulting in a modified client application program interface, wherein the removal of the text data comprises removal of one or more terms in the first description that respectively appear in the first description at least a first threshold number of times;
determine a semantic similarity between the modified client application program interface and a second client application program interface, wherein the semantic similarity is based on a Louvain community detection process;
match the first description to a second description of the second client application program interface based on the semantic similarity, resulting in on or more matched client application program interfaces; and
associate the first client application program interface with a community based on the one or more matched client application program interfaces.

8. The computer program product of claim 7, wherein the removal of the text data further comprises removal of one or more additional terms in the first description that respectively appear in the first description less than a second threshold number of times.

9. The computer program product of claim 7, wherein the community is a first community, and the program instructions are further executable by a processor to cause the processor to generate a second community comprising the modified client application program interface, wherein the second community is utilized to generate a recommendation for a client application program interface.

10. The computer program product of claim 7, wherein the program instructions are further executable by the processor to cause the processor to:
match the first client application program interface to the one or more matched client application program interfaces based on the semantic similarity.

11. The computer program product of claim 7, wherein the community is generated based on a topic modeling associated with a topic non-negative matrix factorization.

12. The computer program product of claim 7, wherein the community is utilized to generate a keyword to employ in provide a recommendation for a client application program interface.

13. A computer-implemented method, comprising:
pre-processing, a device operatively coupled to a processor, the first data, associated with a first description of a first client application program interface, by removing text data associated with the first description, resulting in a modified client application program interface, wherein the removing of the text data comprises removing one or more terms in the first description that respectively appear in the first description at least a first threshold number of times;
determining, by the device operatively coupled to a processor, a semantic similarity between the modified client application program interface and a second client application program interface, wherein the semantic similarity is based on a Louvain community detection process;
matching, by the device, the first description to a second description of the second client application program interface based on the semantic similarity, resulting in on or more matched client application program interfaces; and associating, by the device, the first client application program interface with a community based on the one or more matched client application program interfaces.

14. The computer-implemented method of claim 13, wherein the removing of the text data comprises removing one or more additional terms in the first description that respectively appear in the first description less than a second threshold number of times.

15. The computer-implemented method of claim 13, wherein the community is a first community, and further comprising generating, by the device, a second community comprising the modified client application program interface, wherein the second community is utilized to generate a recommendation for a client application program interface.

16. The computer-implemented method of claim 13, further comprising:

matching, by the device, the first client application program interface to the one or more matched client application program interfaces based on the semantic similarity.

17. The computer-implemented method of claim 13, wherein the community is generated based on a topic modeling associated with a topic non-negative matrix factorization.

18. The computer-implemented method of claim 13, wherein the community is utilized to generate a keyword to employ in provide a recommendation for a client application program interface.

19. A system, comprising:

a memory that stores computer executable components; and a processor that executes the computer executable components stored in the memory, wherein the computer executable components comprise:

a query matcher component that:

receives a query comprising first text data related to an application program interface description;

pre-processes the first text data by removal of one or more terms in the first text data that respectively appear in the first text data at least a first threshold number of times, resulting in a modified first text data; and generates score data based on a similarity between the modified first text data of the query and second text data of a topic related to the query by comparing the first text data to the second text data, wherein the similarity is based on a Louvain community detection process.

20. The system of claim 19, wherein the second text data has been determined to be text data indicative of a text that is related to the topic.

21. The system of claim 19, wherein the score data comprises recommendation data representative of a recommendation of a recommended application program interface to be output in response to receiving the query.

22. A computer program product that facilitates application program interface recommendations, the computer program product comprising a computer readable storage medium having program instructions embodied therewith, the program instructions executable by a processor to cause the processor to:

receive a query comprising first text data related to an application program interface description;

pre-process the first text data by removal of one or more terms in the first text data that respectively appear in the first text data at least a first threshold number of times, resulting in a modified first text data; and generate score data based on a similarity between the modified first text data of the query and second text data of a topic related to the query by comparing the first text data to the second text data, wherein the similarity is based on a Louvain community detection process.

23. The computer program product of claim 22, wherein the second text data has been determined to be text data indicative of a text that is related to the topic.

24. The computer program product of claim 22, wherein the score data comprises recommendation data representative of a recommendation of a recommended application program interface to be output in response to receiving the query.

* * * * *